(12) United States Patent
Whitmore (10) Patent No.: US 11,698,966 B2
(45) Date of Patent: Jul. 11, 2023

(54) SYSTEMS AND METHODS FOR CODE INJECTION DETECTION

(71) Applicant: Capital One Services, LLC, McLean, VA (US)

(72) Inventor: Jon Whitmore, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 296 days.

(21) Appl. No.: 16/846,508

(22) Filed: Apr. 13, 2020

(65) Prior Publication Data

US 2021/0319105 A1   Oct. 14, 2021

(51) Int. Cl.
*G06F 21/56* (2013.01)

(52) U.S. Cl.
CPC .......... *G06F 21/566* (2013.01); *G06F 21/565* (2013.01); *G06F 2221/033* (2013.01)

(58) Field of Classification Search
CPC ...... G06F 21/566; G06F 21/565; G06F 21/64; G06F 21/577; G06F 2221/034; G06F 2221/033
See application file for complete search history.

(56) References Cited

U.S. PATENT DOCUMENTS

| | | | |
|---|---|---|---|
| 9,262,633 B1* | 2/2016 | Todeschini | G06F 21/83 |
| 9,354,849 B2 | 5/2016 | Debate et al. | |
| 9,442,778 B2* | 9/2016 | Desai | G06F 9/54 |
| 2018/0052940 A1* | 2/2018 | Miller | G06F 16/958 |
| 2020/0285752 A1* | 9/2020 | Wyatt | G06F 21/53 |

FOREIGN PATENT DOCUMENTS

WO    2014183391 A1    11/2014

OTHER PUBLICATIONS

Wardle, P., "Dylib hijacking on OS X," Virus Bulletin, pp. 1-18 (2015), available at https://www.virusbulletin.com/virusbulletin/2015/03/dylib-hijacking-os-x.

* cited by examiner

*Primary Examiner* — Ashokkumar B Patel
*Assistant Examiner* — William B Jones
(74) *Attorney, Agent, or Firm* — Bookoff McAndrews, PLLC (57) ABSTRACT

A computer-implemented method for detecting a code injection threat may include: performing a search process on a memory of a computer system to identify property list files; in response to an identification of a property list file, retrieving the property list file; performing an analysis process on the property list file to identify a target identifier; in response to an identification of the target identifier in the property list file, determining whether the target identifier corresponds to an electronic application stored in the memory of the computer system; in response to determining that the target identifier corresponds to the electronic application, determining that the property list file is indicative of a code injection threat to the electronic application; and in response to the determination that the property list file is indicative of a code injection threat to the electronic application, performing a security action based on the property list.

19 Claims, 4 Drawing Sheets

SYSTEMS AND METHODS FOR CODE INJECTION DETECTION

TECHNICAL FIELD

Various embodiments of the present disclosure relate generally to software security, and relate particularly to methods and systems for detecting a code injection threat to an electronic application.

BACKGROUND

Typically, computer systems include an operating system that sequesters various functionalities, privileges, and/or files behind authorizations, permissions, or the like. For example, certain files or actions may be accessible to an administrator level user, but restricted from a lower level user. In another example, an executable file, e.g., an electronic application, may be granted permission to access and/or modify certain files, but may be restricted from accessing and/or modifying others.

Such protections may be used to inhibit unauthorized changes to the operating system and/or other files on the computer system. However, in some instances, users may desire to enact unauthorized changes to the operating system or an electronic application on the computer system. As a result, techniques have been developed to defeat and/or circumnavigate systems of permissions and protections typically included in the operating system of a computer system. Such techniques, however, may leave a computer vulnerable to a malicious attack and/or unintended consequences of unauthorized modifications that may impact performance or operability of the computer system or the electronic application. And, while techniques have been developed in efforts to address such vulnerabilities, conventional techniques may not be adapted for use on devices with compromised security. Moreover, such techniques are generally computationally intensive.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for detecting a code injection threat.

Each of the examples disclosed herein may include one or more of the features described in connection with any of the other disclosed examples.

In one example, a computer-implemented method for detecting a code injection threat may include: performing a search process on a memory of a computer system to identify property list files; in response to an identification of a property list file, retrieving the property list file; performing an analysis process on the property list file to identify a target identifier; in response to an identification of the target identifier in the property list file, determining whether the target identifier corresponds to an electronic application stored in the memory of the computer system; in response to determining that the target identifier corresponds to the electronic application, determining that the property list file is indicative of a code injection threat to the electronic application; and in response to the determination that the property list file is indicative of a code injection threat to the electronic application, performing a security action based on the property list.

In another exemplary embodiment, a system for detecting a code injection threat may include: a memory storing instructions and an electronic application; and a processor operatively connected to the memory and configured to execute the instructions to perform acts. The acts may include: receiving a launch application instruction to execute the electronic application; in response to receiving the launch application instruction, performing a security check process, the security check process including: performing a search process on the memory to identify property list files; in response to an identification of a property list file, retrieving the property list file; performing an analysis process on the property list file to identify a target identifier; in response to an identification of the target identifier in the property list file, determining whether the target identifier corresponds to the electronic application; in response to determining that the target identifier corresponds to the electronic application, determining that the property list file is indicative of a code injection threat to the electronic application; and in response to the determination that the property list file is indicative of a code injection threat to the electronic application, performing a security action based on the property list; and in response to the security check process determining that the property list file is indicative of a code injection threat to the electronic application, performing a security action that includes preventing the electronic application from being executed.

In a further exemplary embodiment, a computer-implemented method for detecting a code injection threat may include: receiving a launch application instruction to execute an electronic application; in response to receiving the launch application instruction, performing a security check process; in response to the security check process determining no threat to the electronic application, retrieving a threat variable; determining whether the threat variable indicates that the electronic application was previously subject to a code injection threat; in response to determining that the threat variable indicates that the electronic application was previously subject to a code injection threat, determining whether a security status of the computer system has been restored relative to when the electronic application was previously subject to the code injection threat; in response to determining that security status of the computer system has not been restored, determining the security check process has been circumvented; and in response to determining the security check has been circumvented, transmitting a circumvented message to a server, the circumvented message indicating that the code injection threat was previously detected but is no longer detectable.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system. A "mobile device" generally encompasses a computer system that is portable, and that may be configured to communicate with other devices over an electronic network such as a telecommunications network or the internet. An "electronic application" generally encompasses an executable file or files that may be added and/or installed onto a computer system to enable the computer system to perform associated functionality.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for software security, and more particularly to detecting a code injection threat to an electronic application. As will be discussed below in more detail, in methods and systems according to the present disclosure, existing techniques may be improved.

A security system of permissions, authorizations, or the like on a computing system may be used not only to protect the computer system from malicious attack and protect the computer system from being unintentionally modified in a manner that impacts performance or operability, but also to protect the integrity of electronic applications that may be installed on the computer system. In one example, mobile devices like cellphones or tablet computers are generally developed as closed platforms in which only authorized electronic applications may be installed, and in which many aspects of the operating system and/or the electronic application are restricted from being changed by the user. Although such measures may help secure the mobile device, another consequence may be that users may desire to install electronic applications or make modifications to an electronic application and/or the operating system of the mobile device that they are not authorized or permitted to do.

Techniques have been developed to defeat and/or circumnavigate systems of permissions and protections typically included in the operating system of a computer system. Such a technique may be typically referred to as a "jailbreak," and a device with compromised security protections may be typically referred to as "jailbroken," in that users and files are no longer confined within the scheme of limited access and permissions intended by the provider of the computer system. In particular, the user and/or executable files on the mobile device are able to access and/or modify other files that may have previously been restricted.

A commonly used technique for modifying an electronic application installed on a computer system is generally referred to as a "code injection," in which code is inserted into a file in order to replace or modify at least a portion of the functionality of that file. In one example of a code injection, the code to be inserted into an electronic application is included in a dynamic library. A dynamic library (e.g., a DLL file, a dylib file, etc.) is a type of file external to an electronic application that can be loaded into the electronic application by reference to add or modify the functionality of the electronic application. The dynamic library with the code to be injected may be paired with a properties file (e.g., a plist file, a preferences file, a manifest file, etc.). A properties file is a type of file that generally includes settings or preferences to be used when executing an electronic application. In this exemplary code injection, the properties file paired with the dynamic library includes an identification of the dynamic library and the electronic application targeted for injection. When the targeted electronic application is executed, the properties file is also executed, and thus the code in the dynamic library is injected into the electronic application.

A code injection might be used to make various modifications to an electronic application such as, for example, a simple color change, or an addition or replacement of an application feature. In some instances, the code injection may be executed intentionally by the user of the computer system, e.g., in order to add or modify an electronic application as desired by the user. In some instances, the code injection may be performed maliciously by an entity or person seeking to compromise the mobile device and/or the electronic application. Although operating systems generally include measures to protect against code injections, such protections are generally disabled via the jailbreaking process. In other words, by jailbreaking a device in order to make unauthorized modifications, a user may make their device more vulnerable to malicious attack.

For example, a code injection may also be used to access sensitive data associated with the electronic application. This could include retrieving such sensitive data and/or retrieving information about the electronic application usable to form or utilize vulnerabilities to the electronic application, even when executed on an un-jailbroken device. In an example, an electronic application may be associated with personally identifying information, financial information, or other confidential information. When the electronic application is installed and/or executed on a jailbroken device, not only may such sensitive information of the user of the device be at risk, but also the integrity of the electronic application may be compromised so as to put the sensitive information of other users at risk as well, even though such users may not have performed a jailbreak on their devices.

Further, while efforts have been made to develop techniques for detecting code injections, many of such techniques may not be available or adapted for use when the device in question has compromised security due to a jailbreak. Moreover, such conventional techniques are generally computationally intensive, which may impact operability or usability of the electronic application and/or mobile device. Accordingly, a need exists to improve detection of and/or response to code injections, and in particular code injections on security-compromised devices.

In an exemplary use case that applies techniques presented herein, a user device, e.g., a cellular phone, associated with a user has been jailbroken, and thus the user device has an operating system with a compromised security status. Installed on the user device is an electronic application that includes sensitive information, e.g., an electronic banking application. The user device also includes a file or files that represent a code injection threat to the electronic application. In some instances, such files may have been obtained intentionally by the user. In some instances, such files may have been placed on the user device by another entity.

Upon receiving an instruction from the user to execute the electronic application, the user device is configured to execute a security check process, e.g., in order to assess whether the electronic application is subject to a code injection threat. Upon identifying the files representing the code injection threat, the security check process causes the user device to perform a security action which may include, for example, notifying an entity associated with the electronic application that the electronic application is subject to a code injection threat, and/or preventing the electronic application from being executed. Additional aspects of the disclosure are discussed in further detail below.

Figure 1:
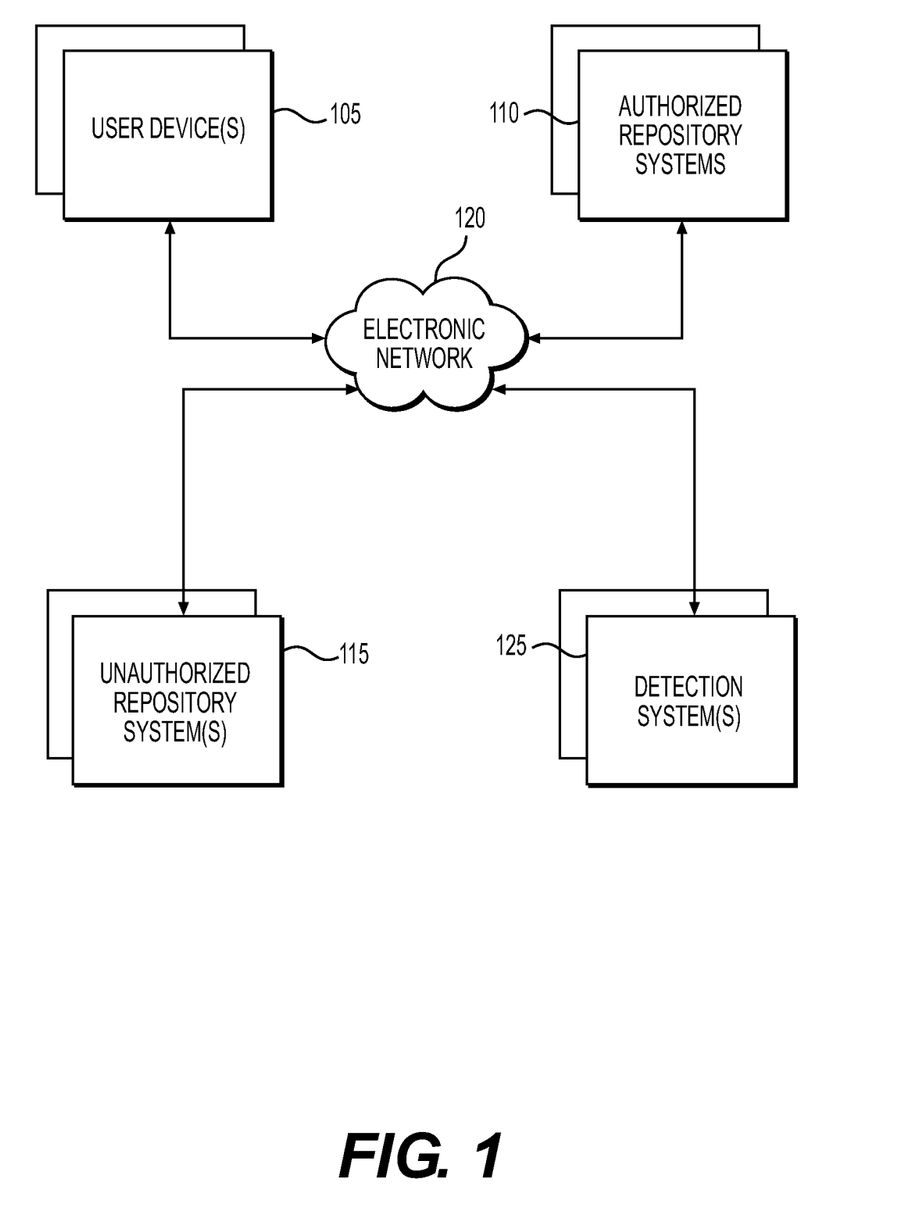
FIG. 1 depicts an exemplary client-server environment that may be utilized according to aspects of the present disclosure.

FIG. 1 depicts an exemplary client-server environment that may be utilized with techniques presented herein. One or more user device(s) 105, one or more authorized repository system(s) 110, and/or one or more unauthorized repository system(s) 115 may communicate across an electronic network 120. The systems of FIG. 1 may communicate in any arrangement. As will be discussed herein, one or more detection system(s) 125 may communicate with the user device 105, the authorized repository system 110, and/or the unauthorized repository system 115 over the electronic network 120 in order to detect and/or respond to a code injection threat against an electronic application installed on the user device 105.

The user device 105 may be a computer system such as, for example, a desktop computer, a mobile device, etc. In an exemplary embodiment, the user device 105 is a cellphone, or the like. In some embodiments, the user device 105 may have an operating system with compromised security status, e.g., the user device 105 may be jailbroken. In some embodiments, the user device 105 may have an operating system that has previously been compromised, but for which the security status has been restored, as discussed in further detail below.

In some embodiments, an electronic application is installed on a memory of the user device 105. In some embodiments, the electronic application is associated with an entity that is also associated with the detection system 125. In some embodiments, the electronic application is not associated with the entity associated with the detection system 125.

As used herein, an "authorized repository" system generally encompasses systems associated with entities that provide and/or are associated with electronic applications. Examples of an authorized repository system 110 may include an application marketplace, storage system, program library, electronic development space, or the like that has been authorized by an entity associated with the user device 105 and/or the operating system of the user device 105 to make and/or distribute electronic applications. In some embodiments, the electronic application is associated with the authorized repository system 110.

As used herein, an "unauthorized repository" system generally encompasses systems associated with files and/or applications that are not authorized for installation on the user device 105 and/or the operating system on the user system 105. In some embodiments, a file or files associated with a code injection threat are associated with the unauthorized repository system 115, as discussed in further detail below.

In various embodiments, the electronic network 120 may be a wide area network ("WAN"), a local area network ("LAN"), personal area network ("PAN"), or the like. In some embodiments, electronic network 120 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 120 includes or is in communication with a telecommunications network, e.g., a cellular network.

The detection system 125 may be configured to detect code injection threats to the electronic application, as discussed in further detail below. In some embodiments, the detection system 125 may be configured to detect code injection threats to a plurality of electronic applications. While FIG. 1 depicts the various systems as physically separate and communicating across network 120, in various embodiments features of certain systems, such as the detection system 125, may be incorporated partially or completely into any of the other systems of FIG. 1. For example, at least a portion of the detection system 125 may be incorporated by the user system 105 and/or the authorized repository system 110. In an exemplary embodiment, at least a first portion of the detection system 125 may be integrated into or installed on the user device 105, e.g., as an electronic application, an executable file or process, or the like. In some embodiments, the at least first portion of the detection system 125 is integrated into the operating system. In some embodiments, a second portion of the detection system 125 is located on a server system in communication with the user device 105 via the electronic network 120.

In an exemplary use case, a first portion of the detection system 125 may be embodied as client software installed on the user device 105 that is configured to run prior to execution of the electronic application and/or prior to a particular resource utilized by the electronic application being accessed. The client software may be configured to generate a device fingerprint that may be uniquely associated with the user device 105, and that may be indicative of various aspects of the user device 105, the user, and/or a history of the user's use of the user device 105. The device fingerprint may include a determined security status of the user device 105, for example a determination as to whether a code injection threat has been detected. The second portion of the detection system 125 may be embodied as server software installed on a server device remote from the user device. The server software may be configured to determine a level of confidence in the user device 105 based on the device fingerprint, compare the determined level of confidence with a predetermined confidence threshold, and selectively permit and restrict access to various features of the electronic application based on the comparison.

In some embodiments, the first portion of the detection system is configured to transmit files associated with a detected code injection threat to the second portion. In some embodiments, such files are used to develop an inoculation, fix, or other remedy for an associated code injection threat. In some embodiments, the client software is a thin client having no user interface and/or no indication of a presence of the software client on the user device 105. In some embodiments, the device fingerprint may be generated and/or updated over time, and the level of confidence for the user device may be determined based on a change in the device fingerprint. In some embodiments, generation of the device fingerprint, the level of confidence, and/or the comparison with the predetermined confidence threshold includes employment of a machine learning model, e.g., a machine learning model configured to identify anomalies arising in a device fingerprint over time.

Figure 2:
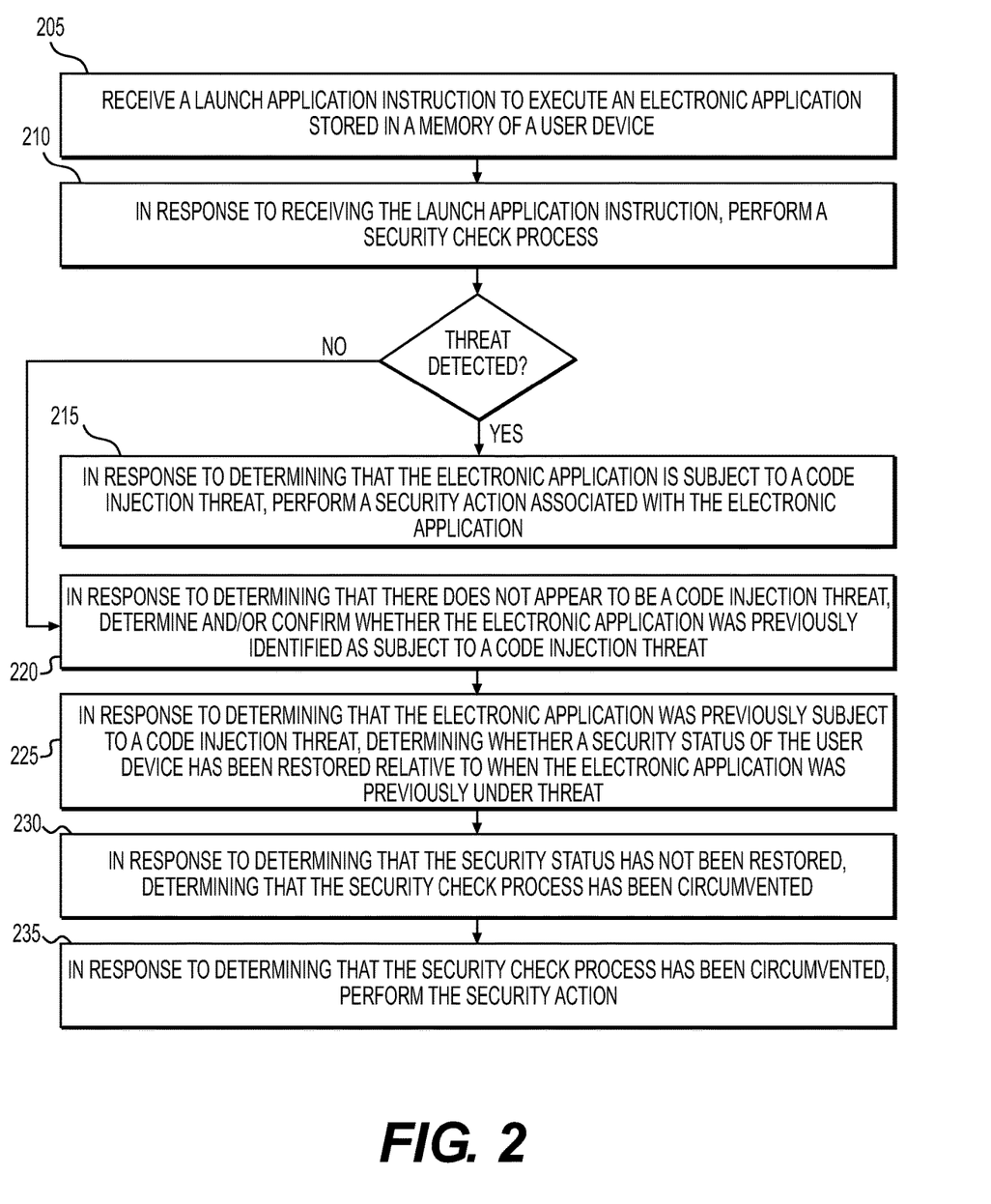
FIG. 2 depicts an exemplary process for detecting a code injection threat that includes performing a security check process.

FIG. 2 illustrates an exemplary process for detecting a code injection threat according to the technologies presented herein. At step 205, the user device 105 may receive a launch application instruction to execute an electronic application stored in a memory of the user device 105. At step 210, in response to the user device 105 receiving the launch application instruction, the detection system 125, e.g., the at least first portion of the detection system 125 included on the user device 105, may perform a security check process, e.g., to determine whether the electronic application is subject to a code injection threat. At step 215, in response to the security check process determining that the electronic application is subject to a code injection threat, the detection system 125 may perform a security action associated with the electronic application. At step 220, in response to the security check process determining that the electronic application does not appear to be subject to a code injection threat, the detection system 125 may determine and/or confirm whether the electronic application was previously identified as subject to a code injection threat. At step 225, in response to determining that the electronic application was previously subject to a code injection threat, the detection system 125 may determine whether a security status of the user device 105 has been restored relative to when the electronic application was previously subject to the code injection threat. At step 230, in response to determining that the security status of the user device 105 has not been restored, the detection system 125 may determine that the security check process has been circumvented. At step 235, in response to determining that the security check process has been circumvented, the detection system 125 may perform a security action, e.g., transmit a circumvented message to the authorized repository system 110 and/or a server system of the detection system 125 remote from the user device 105, whereby the circumvented message indicates that that the security check process has been circumvented and/or that the code injection threat that was previously detected is no longer detectable. Each of these steps is discussed in further detail below.

With regard to step 205, in some embodiments, the launch application instruction may be received from a user associated with the user device 105, e.g., via an interface of the user device 105. In some embodiments, the launch application instruction may be received from the operating system of the user device 105 and/or another electronic application executed on the user device 105. In some embodiments, the launch application instruction may be received from another system via the electronic network 120. In some embodiments, the electronic application may be self-executing, e.g., may be configured to cause itself to be executed.

Figure 3:
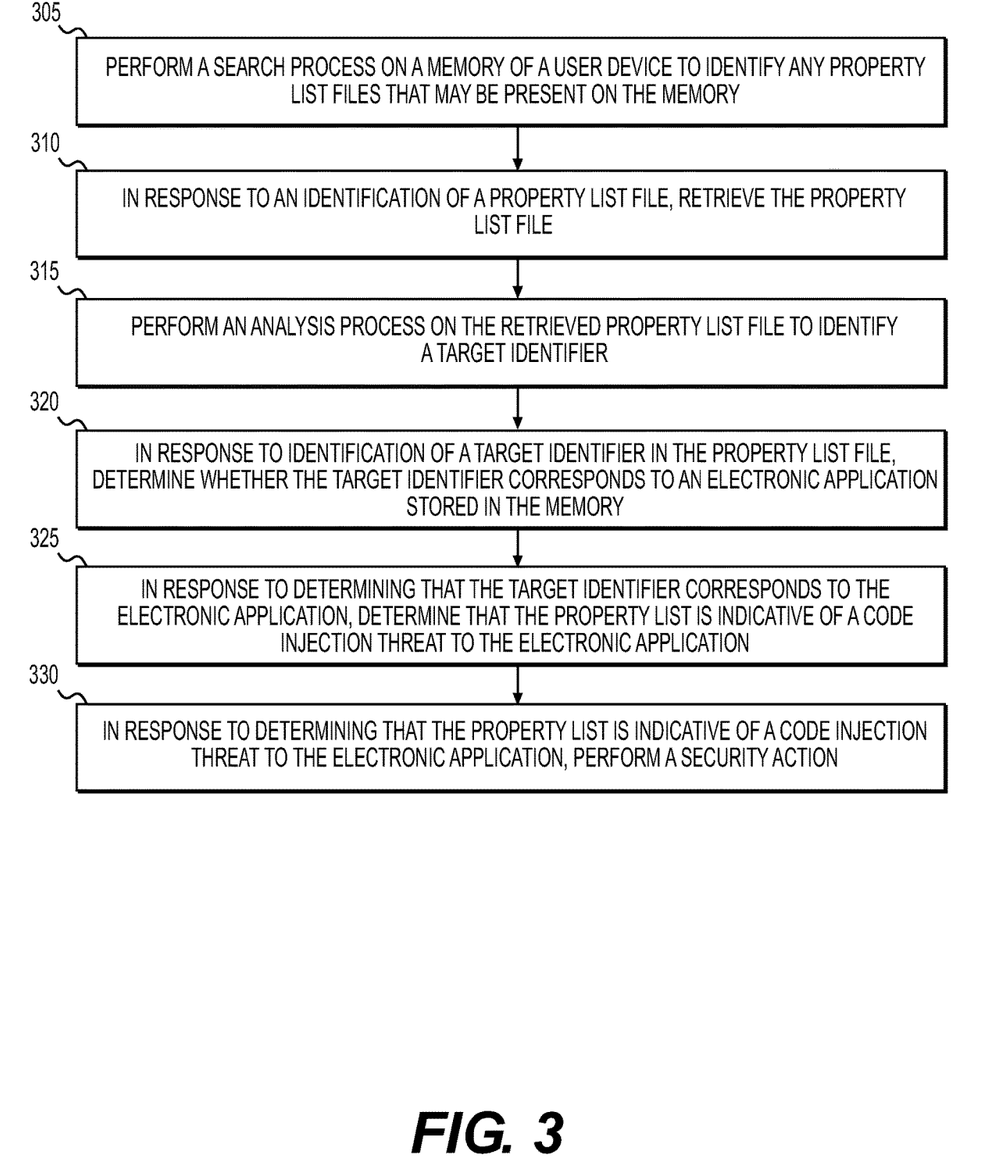
FIG. 3 depicts an exemplary process for performing the security check process of FIG. 2.

With regard to step 210, FIG. 3 illustrates an exemplary process for performing the security check process. At step 305, the detection system 125 may perform a search process on a memory of the user device 105 to identify any property list files that may be present on the memory. As noted above, property list files are files that generally include preferences or settings for an electronic application that are applied when the electronic application is executed. Also, property list files are commonly associated with dynamic library files that are used as part of a code injection. Thus, in some embodiments, property list files may be used to determine whether the electronic application is subject to a code injection threat.

For example, in some embodiments, in computer systems that have an un-compromised security status, property list files are a type of file that is generally restricted from view, access, generation, and/or modification by users and/or electronic applications, and moreover are typically files that have limited permission to act on other files. In contrast, due to the circumvention of the permissions and/or access scheme associated with the security status of the computer system resulting from a jailbreak, property list files may not only be visible to the user and/or electronic applications installed on the computer system, but also may be executable or configured to direct execution of files, programs, or the like to modify, generate, or delete other files on the computer system. Thus, the ability for the search process to have visibility of a property list file in the memory of the user device 105 may be indicative that there is a code injection threat of some kind to the user device 105.

In some embodiments, performing the search process on the memory includes using a file manager protocol of the operating system of the user device 105. Generally, an operating system includes a file manager protocol usable by electronic applications to access various files in the memory. In some instances, however, e.g., when the security status of a computer system is compromised, the file manager protocol may also be compromised. In an example, a previously executed code injection or other malicious modification may prevent the file manager protocol of the operating system from identifying property list files that may be present on the memory. In some instances, the security status of the user device 105 may be restored after a code injection has been performed. As a result, a property list file associated with a code injection threat against the electronic application may be present on the memory of the user system 105, but the file manager protocol may no longer have the appropriate permissions and/or authorizations to identify such file.

In some embodiments, performing the search process on the memory includes using low-level input-output functions of the user device 105. Low-level functions, in contrast with a protocol that is included with the operating system, generally operate within a computer system at a level below the visibility of electronic applications installed via the operating system. For example, in some embodiments, the search process may be performed using a program implemented using low-level functions such as C code. In some embodiments, by using such low-level functions, the search process may circumvent a malicious modification to the file manager protocol of the operating system. In some embodiments, performing the search process on the memory includes using the file manager protocol to perform a search for property list files and, in response to not finding any property list files using the file manager protocol, using the low-level input-output functions to perform another search for property list files.

In some embodiments, results from a search process utilizing the file manager protocol are compared with results from a search process utilizing the lower level functions. A difference in the results may be indicative that the file manager protocol has been maliciously modified and/or that the user device 105 has been jailbroken.

At step 310, in response to an identification of a property list file, the detection system 125 may retrieve the property list file. At step 315, the detection system 125 may perform an analysis process on the retrieved property list file to identify a target identifier. Property list files that are associated with a code injection threat generally include an identification of the electronic application targeted by the threat. For example, a property list file may include a filter that prevents the property list file from executing unless a specified electronic application is executed. In another example, a property list file may include a reference to a dynamic library associated with a specific electronic application. In some embodiments, a property list file includes a bundle identifier. A bundle identifier is a unique identifier assigned to each electronic application, and is generally used by a property list file to determine where to apply preferences and settings. Thus, in some embodiments, a bundle identifier is usable to determine the electronic application targeted by the property list file. As used herein, a "target identifier" generally encompasses information in a property list file that is indicative of a particular electronic application associated with the property list file. In an exemplary embodiment, the analysis process may include parsing the property list file to extract a bundle identifier, and identifying the bundle identifier as the target identifier.

At step 320, in response to an identification of a target identifier in the property list file, the detection system 125 may determine whether the target identifier corresponds to the electronic application. In some embodiments, in which the target identifier includes a bundle identifier, such determination may be based on whether the bundle identifier matches an application bundle identifier of the electronic application. As noted above, a bundle identifier is a unique identifier assigned to each electronic application. Thus, in some embodiments, the detection system 125 may determine that the target identifier corresponds to the electronic application in response to determining that the bundle identifier matches the application bundle identifier.

In some instances, the search process may identify a property list file that is associated with a code injection threat against another electronic application, e.g., an electronic application that is not associated with the detection system 125. The presence of a code injection threat against another electronic application may be indicative that the user device 105 is compromised or at risk. Moreover, it may be beneficial to notify an entity associated with the other electronic application regarding the presence of the code injection threat. Thus, in some embodiments, in response to determining that the bundle identifier does not match the application bundle identifier, the detection system 125 may determine whether the target identifier matches one of a plurality of application bundle identifiers. In some embodiments, the plurality of application bundle identifiers may be stored in the memory of the user device 105. In some embodiments, in response to determining the bundle identifier matches the one of the plurality of application bundle identifiers, the detection system 125 may cause the user device 105 to transmit the bundle identifier to a server system of the detection system 125 remote from the user device 105. In some embodiments, in response to determining the bundle identifier matches the one of the plurality of application bundle identifiers, the detection system 125 may cause the user device 105 to transmit an alert message to the server system of the detection system 125 that indicates an identify of the other electronic application corresponding to the one of the plurality of application bundle identifiers corresponding to the bundle identifier, and/or that the indicated other electronic application is a target of a code injection threat. In some embodiments, the detection system 125 may transmit the alert message to an entity associated with the other electronic application, e.g., the authorized repository system 110.

At step 325, in response to determining that the target identifier corresponds to the electronic application, the detection system 125 may determine that the property list file is indicative of a code injection threat to the electronic application. At step 330, in response to the determination that the property list file is indicative of a code injection threat to the electronic application, the detection system 125 may perform a security action based on the property list (step 215 of FIG. 2).

With reference again to FIG. 2, a "security action" generally encompasses any acceptable action taken in response to identification of a security threat such as, for example, mitigating the threat, preventing a compromised file from being accessed or executed, and/or retrieving information that may be used to mitigate the threat. For example, in some embodiments, performing the security action includes terminating the electronic application. In some embodiments, performing the security action includes preventing the electronic application from being executed. In some embodiments, performing the security action includes preventing the electronic application from being executed until the detection system 125 determines and/or receives an indication that a security status of the user device 105 has been restored, as discussed in further detail below.

In some embodiments, in conjunction with and/or in addition to performing the security action, in response to determining that the property list file is indicative of a code injection threat to the electronic application, the detection system 125 may update a threat variable associated with the electronic application to indicate that the electronic application has been and/or is subject to a code injection threat. In some embodiments, the indication may include information associated with a date and/or time that the threat was identified, and/or other information associated with the threat. In some embodiments, the threat variable is included in a device fingerprint that is assembled for the user device 105. In some embodiments, the detection system 125 may track the device fingerprint of the user device 105 over time, and may determine an anomaly in the device fingerprint indicative of a compromise in security such as a code injection threat based on the tracking over time.

In some embodiments, performing the security action may include causing the user system 105 to transmit an alert message to a server system of the detection system 125 remote from the user device 105, the alert message indicating that the electronic application is a target of a code injection threat. In some embodiments, the alert message may include information and/or data associated with the bundle identifier, the property list file, a dynamic library associated with the property list file, the user device 105, or the like.

In some embodiments, in response to the alert message, the detection system 125 may block or quarantine transmissions to and/or from the electronic application. For example, in response to an alert message indicating that the electronic application executed on the user device 105 is compromised, the detection system 125 may cause a server system associated with the electronic application from receiving and/or responding to requests transmitted by the user device 105 on behalf of the compromised electronic application.

In some embodiments, performing the security action may only include performing actions that are not visible to the user. For example, in some instances, the user may have intentionally attempted to perform a code injection on the electronic application. If the user becomes aware that the code injection has been detected, the user may attempt to develop or employ a method of attack that may not be detectable. By, for example, transmitting the alert message to the server system of the detection system 125 without making the user aware of the detection of the code injection threat, the detection system 125 may enable the entity associated with the detection system 125 to develop a protection or mitigation for the code injection before the user may have had time to develop or employ an undetectable attack.

With regard to step 220, in some instances, the detection system 125 may determine that the electronic application does not appear to be subject to a code injection threat. This determination may, in some instances, be accurate, and there may not be a code injection threat targeting the electronic application. This determination may, in some instances, be a false negative. For example, the code injection threat may have been developed or modified so as to be undetectable. If the electronic application was previously subject to a code injection threat, e.g., as identified by a previous iteration of the security check process, then it may be more likely that a subsequent determination of no threat is a false negative. In some embodiments, the determination is compared with at least one other determination from any acceptable security status detection process. A positive determination in one process in conjunction with a negative result in another may be indicative of not only a compromise in security status such as a code injection threat, but also that the process having a negative determination may be compromised or circumvented. Such a comparison may thus be usable to detect and/or address such a compromise or circumvention.

In some embodiments, determining and/or confirming whether the electronic application was previously identified as subject to a code injection threat (step 220) may include retrieving the threat variable associated with the electronic application, and determining whether the threat variable indicates that the electronic application was previously subject to a code injection threat.

With regard to step 225, in some instances, a restoration of the security status of the user device 105 may result in no threat being detected when a threat was previously detected during a previous iteration of the security check process. As noted above, a jailbreak may enable access to and modification of files that may otherwise have been restricted. Thus, restoring the security status of a computer device to an un-jailbroken state may restore the restrictions to such files. In some instances, such restoration may prevent a code injection from being executed. Therefore, it may be less likely that a no threat determination by the security check process is a false negative when the security status of the computer device has been restored since a previous positive identification of a threat.

Conversely, if the security status of the computing device has not been restored, it may be more likely that the code injection threat that was previously present may have been modified so as to be undetectable and/or that the security check process has been circumvented (step 230), and thus that the security action should be performed (step 235). In some embodiments, in response to determining that the security check process has been circumvented, the security action may include causing the user device 105 to transmit a circumvention message to the server system of the detection system 125 remote from the user device 105 and/or the authorized repository system 110, or the like.

Figure 4:
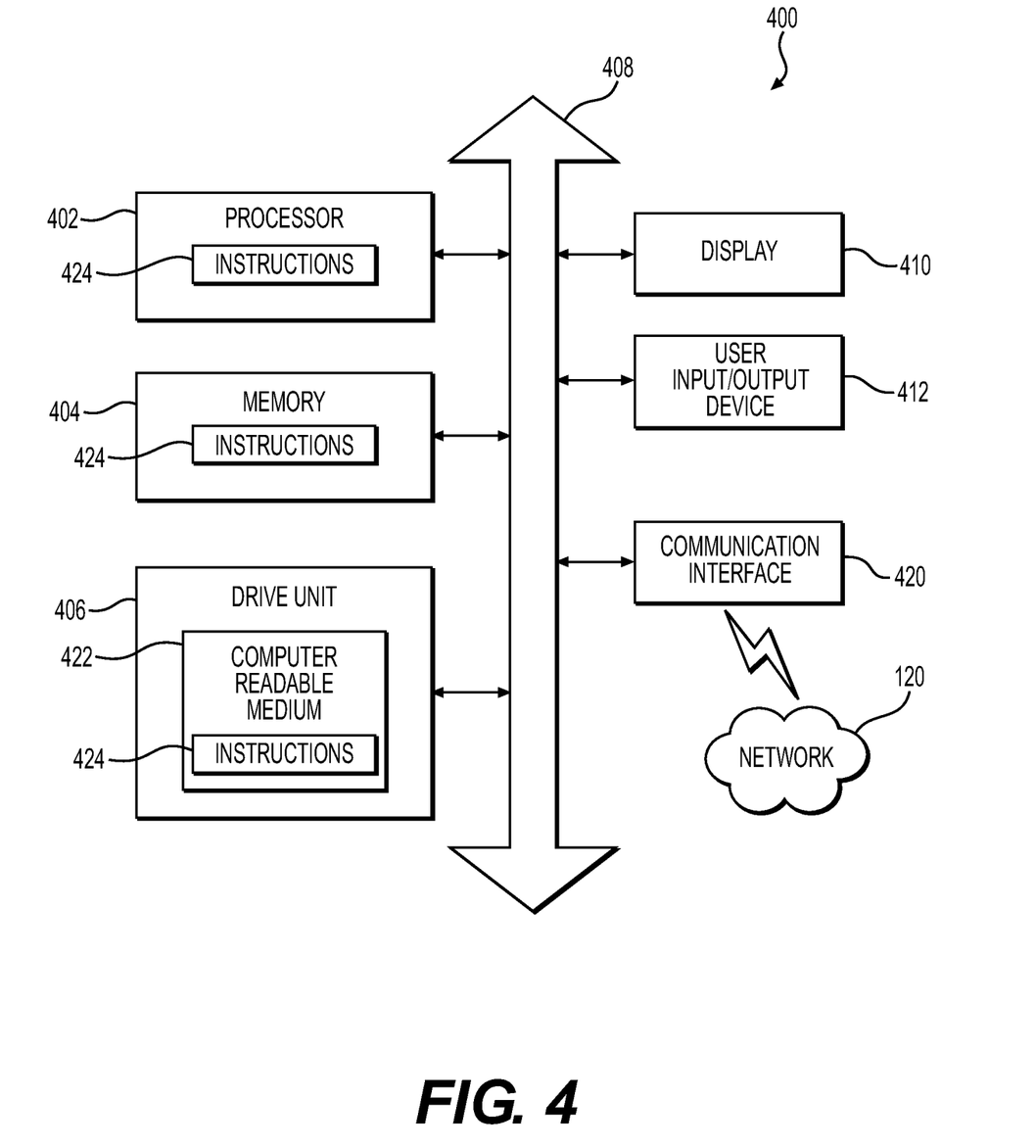
FIG. 4 depicts an example of a computing device, according to aspects of the present disclosure.

FIG. 4 is a simplified functional block diagram of a computer 400 that may be configured as a device for executing the methods of FIGS. 2 and 3, according to exemplary embodiments of the present disclosure. FIG. 4 is a simplified functional block diagram of a computer that may be configured as the detection system 125 and/or the user device 105 according to exemplary embodiments of the present disclosure. Specifically, in one embodiment, any of the mobile devices, systems, servers, etc., discussed herein may be an assembly of hardware 400 including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-3, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for detecting a code injection threat, comprising:
    performing a search process on a memory of a computer system to identify property list files, wherein the search process is configured such that property list files have a visibility to the search process that is dependent on whether the computer system has been compromised;
    in response to an identification of a property list file, retrieving the property list file;
    performing an analysis process on the property list file to identify a target identifier;
    in response to an identification of the target identifier in the property list file, determining whether the target identifier corresponds to an electronic application stored in the memory of the computer system;
    in response to determining that the target identifier corresponds to the electronic application, determining that the property list file is indicative of a code injection threat to the electronic application; and
    in response to the determination that the property list file is indicative of a code injection threat to the electronic application, performing a security action based on the property list.

2. The computer-implemented method of claim 1, wherein performing the search process on the memory includes using a file manager protocol of the computer system.

3. The computer-implemented method of claim 1, wherein the performing the search process on the memory includes using low-level input-output functions of the computer system.

4. The computer-implemented method of claim 3, wherein the performing the search process on the memory further includes:
    using a file manager protocol of the computer system;
    wherein the using of the low-level input-output functions is performed in response to not finding any property list files using the file manager protocol.

5. The computer-implemented method of claim 1, wherein performing the analysis process includes:
   parsing the property list file to extract a bundle identifier; and
   identifying the bundle identifier as the target identifier.

6. The computer-implemented method of claim 5, wherein determining whether the target identifier corresponds to an electronic application stored in the memory of the computer system includes:
   determining whether the bundle identifier matches an application bundle identifier of an application stored in the memory of the computer system; and
   determining that the target identifier corresponds to the electronic application in response to determining that the bundle identifier matches the application bundle identifier.

7. The computer-implemented method of claim 6, wherein determining whether the target identifier corresponds to an electronic application stored in the memory of the computer system further includes:
   in response to determining the bundle identifier does not match the application bundle identifier, determining whether the target identifier matches one of a plurality of application bundle identifiers; and
   in response to determining the bundle identifier matches the one of the plurality of application bundle identifiers, transmitting an alert message to a detection server system, the alert message indicating that an electronic application corresponding to the one of a plurality of application bundle identifiers is a target of a code injection threat.

8. The computer-implemented method of claim 6, wherein the performing the security action includes transmitting an alert message to a detection server system, the alert message indicating that the electronic application is a target of a code injection threat.

9. The computer-implemented method of claim 6, wherein the performing the security action includes terminating the electronic application.

10. The computer-implemented method of claim 9, wherein the performing the security action further includes preventing the electronic application from being executed until an indication that a security status of the computer system has been restored.

11. A system for detecting a code injection threat, the system comprising:
   a memory storing instructions and an electronic application; and
   a processor operatively connected to the memory and configured to execute the instructions to perform acts that include:
   receiving a launch application instruction to execute the electronic application;
   in response to receiving the launch application instruction, performing a security check process, the security check process including:
      performing a search process on the memory to identify property list files, wherein the search process is configured such that property list files have a visibility to the search process that is dependent on whether the computer system has been compromised;
      in response to an identification of a property list file, retrieving the property list file;
      performing an analysis process on the property list file to identify a target identifier;
      in response to an identification of the target identifier in the property list file, determining whether the target identifier corresponds to the electronic application;
      in response to determining that the target identifier corresponds to the electronic application, determining that the property list file is indicative of a code injection threat to the electronic application; and
      in response to the determination that the property list file is indicative of a code injection threat to the electronic application, performing a security action based on the property list; and
   in response to the security check process determining that the property list file is indicative of a code injection threat to the electronic application, performing a security action that includes preventing the electronic application from being executed.

12. The system of claim 11, wherein performing the search process on the memory includes using a file manager protocol of the computer system.

13. The system of claim 11, wherein performing the search process on the memory includes using low-level input-output functions of the computer system.

14. The system of claim 13, wherein performing the search process on the memory further includes:
   using a file manager protocol of the computer system;
   wherein the using of the low-level input-output functions is performed in response to not finding any property list files using the file manager protocol.

15. The system of claim 11, wherein performing the analysis process includes:
   parsing the property list file to extract a bundle identifier; and
   identifying the bundle identifier as the target identifier.

16. The system of claim 15, wherein determining whether the target identifier corresponds to an electronic application stored in the memory of the computer system includes:
   determining whether the bundle identifier matches an application bundle identifier of an application stored in the memory of the computer system; and
   determining that the target identifier corresponds to the electronic application in response to determining that the bundle identifier matches the application bundle identifier.

17. The system of claim 16, wherein performing the security action further includes transmitting an alert message to a detection server system, the alert message indicating that the electronic application is a target of a code injection threat.

18. The system of claim 11, wherein the security check process further includes:
   in response to determining that the property list file is indicative of a code injection threat to the electronic application, updating a threat variable associated with the electronic application to indicate that the electronic application was subject to a code injection threat.

19. The system of claim 11, wherein the security check process further includes:
   in response to receiving another launch application instruction, performing the security check process again;
   in response to the security check process determining no threat to the electronic application, retrieving a threat variable;
   determining whether the threat variable indicates that the electronic application was previously subject to a code injection threat;

in response to determining the threat variable indicates that the electronic application was previously subject to a code injection threat, determining whether a security status of the computer system has been restored relative to when the electronic application was previously subject to the code injection threat;

in response to determining that security status of the computer system has not been restored, determining the security check process has been circumvented; and in response to determining the security check has been circumvented, transmitting a circumvented message to a server, the circumvented message indicating that the code injection threat was previously detected but is no longer detectable.

* * * * *